United States Patent [19]

Ouellette

[11] Patent Number: 5,498,433

[45] Date of Patent: Mar. 12, 1996

[54] APPARATUS AND PROCESS FOR FORMING SHEETS OF MATERIAL HAVING A UNIFORM THICKNESS

[75] Inventor: Edward L. Ouellette, Corinth, Tex.

[73] Assignee: Recot, Inc., Pleasanton, Calif.

[21] Appl. No.: 423,733

[22] Filed: Apr. 18, 1995

[51] Int. Cl.[6] .............................. A21C 3/00; A21D 6/00; A23P 1/00

[52] U.S. Cl. .................. 426/502; 264/153; 264/163; 425/294; 425/298; 425/363; 426/503; 426/517

[58] Field of Search ...................... 425/141, 294, 425/298, 315, 363; 264/153, 163; 426/502, 503, 517

[56] References Cited

U.S. PATENT DOCUMENTS

| | | | |
|---|---|---|---|
| 2,737,130 | 3/1956 | Rhodes | 425/367 |
| 3,843,434 | 10/1974 | Heiks et al. | 425/141 |
| 3,907,478 | 9/1975 | Vernon et al. | 425/367 |
| 4,000,402 | 12/1976 | Higham | 425/141 |
| 4,067,677 | 1/1978 | Sakurazawa | 425/141 |
| 4,226,150 | 10/1980 | Reed | 83/344 |
| 4,336,010 | 6/1982 | Thompson | 425/141 |
| 4,372,736 | 2/1983 | Gooch et al. | 425/149 |
| 4,553,461 | 11/1985 | Belongia | 83/344 |
| 4,759,247 | 7/1988 | Bell et al. | 83/346 |
| 4,770,078 | 9/1988 | Gautier | 83/344 |
| 4,787,835 | 11/1988 | Cavanagh | 425/150 |
| 4,810,179 | 3/1989 | Cavanagh | 425/141 |
| 4,838,156 | 6/1989 | Hafner et al. | 100/47 |
| 4,917,590 | 4/1990 | Svengren et al. | 425/321 |
| 5,061,337 | 10/1991 | Fraser | 425/141 |
| 5,079,014 | 1/1992 | Morikawa et al. | 426/502 |
| 5,091,202 | 2/1992 | Hayashi | 426/502 |
| 5,094,790 | 3/1992 | Halter | 425/141 |
| 5,106,636 | 4/1992 | Ban et al. | 426/502 |
| 5,110,277 | 5/1992 | Hayashi | 425/141 |
| 5,124,163 | 6/1992 | Hayashi | 426/502 |
| 5,158,724 | 10/1992 | Yagi et al. | 425/141 |
| 5,174,185 | 12/1992 | Aichele | 83/346 |
| 5,180,593 | 1/1993 | Mistretta et al. | 425/363 |
| 5,204,123 | 4/1993 | Hayashi | 425/141 |
| 5,295,803 | 3/1994 | Ogawa et al. | 425/141 |
| 5,378,133 | 1/1995 | Atwood et al. | 425/141 |

FOREIGN PATENT DOCUMENTS 2750530  11/1977  Germany .

*Primary Examiner*—George Yeung
*Attorney, Agent, or Firm*—Rothwell, Figg, Ernst & Kurz

[57] ABSTRACT

An apparatus for forming a sheet of material from a supply of the material includes a pair of rotatable rolls that define a gap which forms the material into a sheet. The size of the roll gap is maintained constant during the sheeting operation despite forces exerted on the apparatus caused by inconsistencies in the material being sheeted. The apparatus has a force-applying mechanism which applies a selected amount of force against one of the rolls to bias the one roll toward the other roll, the amount of force being sufficient to overcome any force exerted on the apparatus by the material during sheeting, which forces would otherwise result in variations in the size of the roll gap and the thickness of the resulting product. The one roll is movably mounted in scissor-like fashion and is acted on by the force-applying mechanism in a direction which biases the one roll against the other roll.

17 Claims, 2 Drawing Sheets

APPARATUS AND PROCESS FOR FORMING SHEETS OF MATERIAL HAVING A UNIFORM THICKNESS

BACKGROUND OF THE INVENTION

1. Field of the Invention

The present invention relates to an apparatus and process for forming a sheet of material having a uniform thickness and, more particularly, to an apparatus and process for forming a sheet of dough material, e.g., masa (corn-based dough), having a uniform thickness.

2. Description of Relevant Art

Apparatus for forming sheets of various materials, including dough or like food materials, by forcing the material through a gap or nip located between a pair of confronting rotating rolls are known in the art. In such apparatus, the supply or mass of dough is positioned above the gap formed between the confronting rolls, and the dough mass is forced into the gap with the rolls forming the dough into a sheet. The dough sheet may be cut or suitably portioned, and the portions are then processed according to the requirements for the desired product. For example, in the case of snack food products, the cut portions typically are baked or fried, seasoned, and then packaged.

Various problems exist in the production of sheeted materials using known sheerer apparatus. One significant problem involves the thickness of the final product (which may be, for example, tortilla chips). Product thickness is a characteristic which strongly influences the product attributes that are important to consumers. In other words, a product that is too thick typically is unacceptable or unsatisfactory to consumers.

In the known dough-sheeting apparatus mentioned above, variations or inconsistencies often exist in the rheology of the dough or masa mass that is fed into the gap between the rolls. These variations tend to exert substantial force and pressure against the rolls and cause the framework of the apparatus (which supports the rolls) to deflect, which results in fluctuations or changes in the size of the roll gap, which in turn results in variations in the thickness of the dough sheet and thus the final food product. One way this problem has been handled is for a person operating the sheerer apparatus to monitor such deflections and manually adjust the position of one of the rolls. These manual adjustments typically are required about 20–30 times during a seven hour period. In addition, and perhaps more significantly, manual adjustment of the roll gap size has proven unsatisfactory in that this method yields products about 30% of which are down-graded by consumers as being too thick. Such a large percentage of unsatisfactory product is unacceptable.

Furthermore, the need to provide the sheerer apparatus with a mechanism that permits continuous adjustment of one of the sheerer rolls increases the cost of the apparatus. In addition, the roll position adjusting mechanism increases the complexity of the apparatus and, consequently, reduces the mechanical reliability of the apparatus. A less reliable apparatus is prone to breakdowns which result in machine downtime and reduced overall efficiency. Accordingly, there is a need in the art for an improved apparatus for producing sheeted materials having a uniform thickness.

SUMMARY OF THE INVENTION

The present invention provides an apparatus for forming a sheet of material having a uniform thickness despite variations or inconsistencies in the composition of the material. The material may be, for example, dough, masa, etc. The apparatus includes a support with a pair of rotatable rolls mounted thereon to define a gap between the rolls. A mass of the material is fed into the gap and the rolls form the material into a sheet. The two rolls are mounted on the support frame of the machine in a manner which provides a fixed gap size between the rolls. The first of the rolls is mounted on the machine in a fixed non-movable position. The second roll is securely mounted on the machine but it movable relative the first roll so as to form a desired gap size. The second roll is biased or forced toward the first roll by force-applying members that exert substantial force on the second roll to counteract any forces applied to the apparatus by the material mass being sheeted which, in the absence of the force-applying members, would tend to deflect the frame of the apparatus and alter the gap size and thus the thickness of the resulting sheet. For example, the machine operator can set the force applied to the second roll at a value that is greater than the amount of force that will be exerted on the apparatus during the sheeting operation, thereby assuring a constant gap size and sheet thickness. A rotating cutter may be secured adjacent one of the rolls to cut individual product portions from the sheet.

DETAILED DESCRIPTION OF PREFERRED EMBODIMENTS

Figure 1:
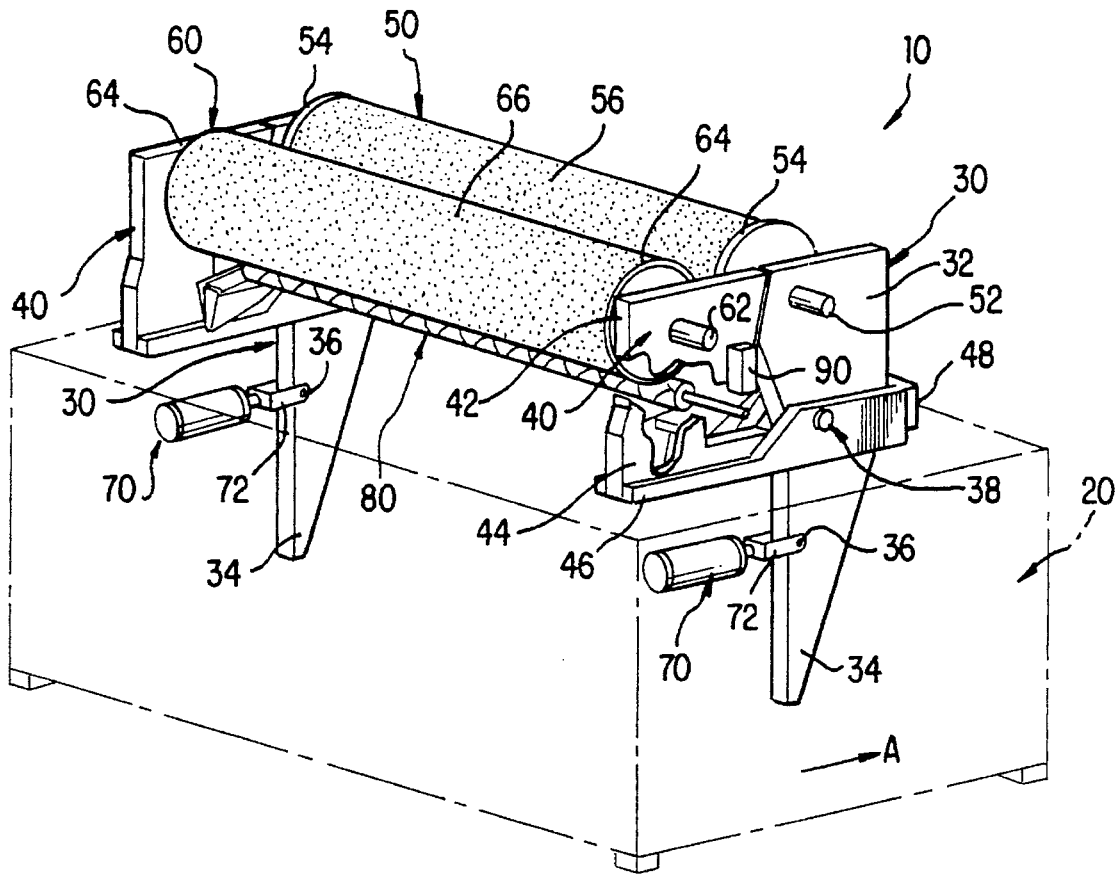
FIG. 1 is a perspective view of an apparatus according to a first embodiment of the present invention for forming sheets of a material which have a uniform thickness.

With reference to FIG. 1, an apparatus for forming a sheet of material having a substantially uniform thickness is indicated generally by the reference numeral 10 and includes a support table or frame 20 to which a pair of rotatable rolls 50, 60 are mounted. The apparatus 10 will be referred to herein as a sheerer apparatus and may be used to sheet various materials. Although the apparatus is described below in connection with preferred embodiments for sheeting dough products, for example, sheets of masa or corn-based dough, it should be appreciated that such description is for exemplary purposes only and is not intended to limit the broad applications of the invention.

The sheerer apparatus 10 includes a support 20 in the form of a table or frame to which is secured a pair of first or rear frame members 30 that rotatably support the ends of a rear roll 50, and a pair of second or front frame members 40 that rotatably support the ends of a front roll 60. See FIG. 1. The rear roll 50 and front roll 60 each have, respectively, opposite ends 52, 62 which are secured to the frame members 30, 40 via bearings that permit smooth rotation of the rolls. Rear roll 50 has a roll portion 56 and bearers 54 located near each of its ends, and front roll 60 has bearers 64 located near each of its ends and a roll portion 66 therebetween. The bearers 54, 64 of either or both rolls may extend outward a greater distance than the roll surfaces 56, 66, i.e., the diameter of the bearers may be greater than the diameter of the portion 56 or 66 of the roll(s). As explained below, the bearers of the two rolls engage each other and the difference between the diameters of the bearers and the roll portions determines the size of the gap therebetween.

Each front frame member 40 includes an upper portion 42 and a lower portion 44, the front roll 60 being mounted at the upper portion 42. A portion of the frame member 40 is broken away in FIG. 1 and shows the mounting assembly of the cutter member 80 which includes an induced-camber cutter in which the center portion thereof is bowed outward to ensure maximum contact between the cutter surface and the outer surface of front roll 60. The induced-camber cutter 80 is disclosed in detail in co-pending application Ser. No. 292,816, filed on Aug. 10, 1994, which disclosure is incorporated herein by reference.

The front frame member 30 preferably is fixed to support 20 and, therefore, the position of front roll 50 is fixed with respect to support 20 as well. Each rear frame member 30 is a scissor-like member with an upper end 32 and a lower end 34 and is secured to support 20 at a pivot connection 38 so as to be pivotally adjustable with respect thereto. Specifically, frame members 30 are pivotally connected to support 20 and, along with the fixed frame members 40, form a scissor-like mounting arrangement for rolls 50, 60. The rear frame members 30 are secured at a pivot connection 38 via support beams 46, 48 with the frame members 30 being free to pivot with respect to support 20. Moving the end 32 of a frame member 30 in the direction of arrow A (FIG. 1) causes the frame 30 to pivot about connection 24 in scissor-like fashion, with the rear roll 50 being moved (or forced) toward front roll 60. The scissor-like mounting arrangement is disclosed in detail in the aforesaid co-pending application Ser. No. 292,816 the disclosure of which is incorporated herein by reference. It should be recognized that it is possible to vary the configuration of the roll frame members shown in FIG. 1 while still achieving the mounting of the rolls which permits application of the present invention. By selecting the size of the roll gap G, the thickness of the sheet produced by the rotating rolls 50, 60 may be precisely controlled. A mass of dough is fed into the gap G where it is forced between the rotating rolls 50, 60 and sheeted to a desired thickness. The formed dough sheet adheres to front roll 60 due to differential speed between rolls 50 and 60. The front and rear rolls 50, 60 are rotatably driven by drive devices (not shown) as is known in the art, and the rolls are provided with bearings to facilitate smooth rotation thereof.

As explained above, a significant problem which arises during the sheeting of various materials, including dough, is that the size of the gap between the rolls does not remain constant due to variations in the composition of the material, for example, inconsistencies in the rheology of the dough mass. The variations in the dough rheology can exert substantial forces on the sheerer apparatus, and in particular, on the frame members which support the front and rear rolls. The dough mass may exert sufficient force on the apparatus to deflect the rolls or roll support members, which deflection causes fluctuations in the roll gap size and consequent non-uniformity in the final product thickness. The present invention overcomes this problem by maintaining the size of the gap between the rolls at a substantially constant value to ensure that the final product has a substantially constant thickness.

Figure 3:
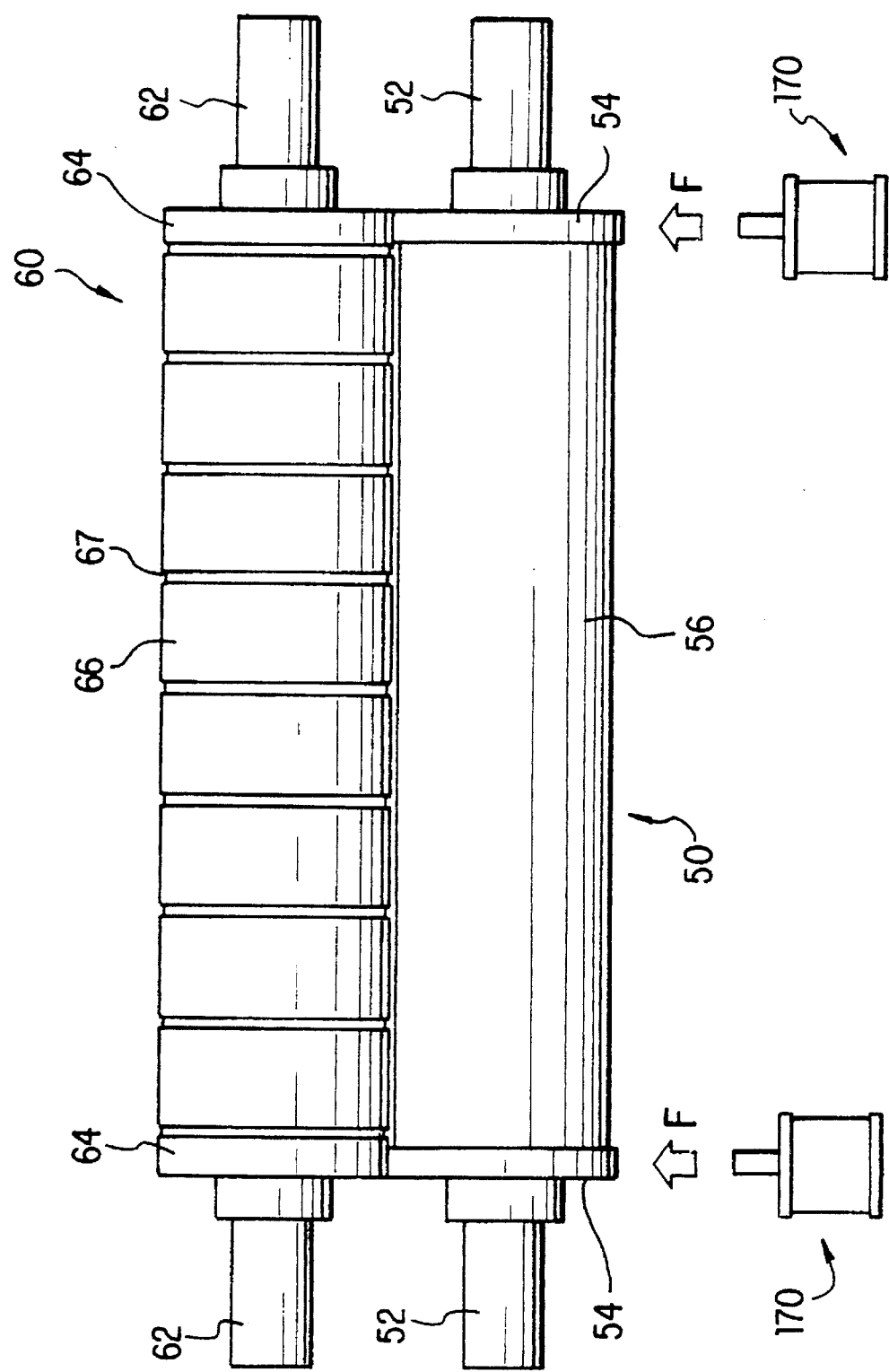
FIG. 3 is a plan view of the rolls of the apparatus according to the present invention showing the forces applied to the one roll.

According to the present invention, force is applied against one of the rolls or the roll supports to bias the one roll toward the other roll. In the illustrated embodiment, the rear roll 50 is biased in a direction toward the front roll 60. As mentioned above and as shown in FIG. 3, the bearers 64 of the front roll abut the bearers 54 of the rear roll so as to form the gap G between the roll portions 56 and 66. In the embodiment of FIG. 3, the diameter of rear roll portion 56 is less than the diameter of the rear roll bearers 54 such that when bearers 54 contact the front roll bearers 64, a gap G of desired size is present between roll portions 56 and 66. It will be recognized that either or both rolls 50, 60 could have a central roll portion with a diameter less than that of the roll's bearers to form the desired roll gap G, and the construction shown in FIG. 3 is only one example of many possible configurations.

Referring to FIG. 1, the rear frame members 30 are each engaged at 36 by force-applying elements indicated generally at 70. The elements 70 may include a clevis-shaped bracket 72 which engages and applies force against each rear frame member 30 below pivot point 38 to move lower portion 34 in the direction of arrow A, which forces rear roll 50 toward front roll 60. The elements 70 can be any suitable force-applying mechanism including, but not limited to, hydraulic cylinders, air cylinders, screw-jack devices, etc. In addition, and as discussed further below, the force may be applied to the roll itself, the roll bearers, the support frame, or any other structure which transmits the force so as to move the one roll toward the other roll. For example, it will be clear to persons skilled in the art that the rear frame member can be driven at various locations (other than that shown in FIG. 1) to apply the desired force against the rear roll.

Each rear frame member 30 preferably is mounted on anti-friction bearings to facilitate smooth and easy movement of the frame about pivot point 38 and along support 20. In addition, the length of the rear frame members 30, i.e., the length of the scissor arms, can be selected to maximize the mechanical advantage afforded by same, thereby reducing the amount of force that must be exerted on lower end 34 of frame members 30 by force-applying elements 70. Also, the scissor mounting assembly contains fewer moving parts and is therefore less complicated and costly that sliding mechanisms used in prior art dough sheeting apparatus.

In a preferred embodiment, the force applying elements 70 are hydraulic cylinders which are actuated to move or drive the bracket 72 outward from the cylinder 70, i.e., along arrow A in FIG. 1, and force the rear roll 50 toward the front roll 60. As explained above, the bearers 54, 64 of the respective rolls are in face-to-face contact and, therefore, applying force against the rear roll 50 does not move the roll portions 56, 66 closer together and thus does not decrease the size of gap G. However, the force-applying elements 70 bias the rear roll 50 against the front roll 60 (the amount of force applied being adjustable depending on the particular mechanism used), whereby the apparatus 10 can withstand a predetermined amount of force exerted thereon during sheeting of the material without the size of the roll gap G, and the consequent thickness of the sheeted product, being altered or adversely affected.

The operation of the bearers 54, 64 of the rolls 50, 60 will now be explained. The bearers 64 of front roll 60 are preferably fixed on roll 60 such that the bearers 64 rotate along with the roll 60. The bearers 54, however, are preferably secured to rear roll 50 so as to be rotatable with respect to roll 50. The drive device rotates front roll 60 and bearers 64 (which are in contact with bearers 54 of rear roll 50). Rear roll 50 is also rotated by a drive device, but the bearers 54 are not rotated by said drive device. However, the rotating bearers 64 of rotating front roll 60 rotate bearers 54 of rear roll 50. Thus, the front and rear rolls 50, 60 are each rotated at a desired speed with the bearers 54 of roll 50 being driven by bearers 64 of roll 60. Of course, persons skilled in the the art will recognize that the embodiment described above is only one example of possible configurations of the invention.

Figure 2:
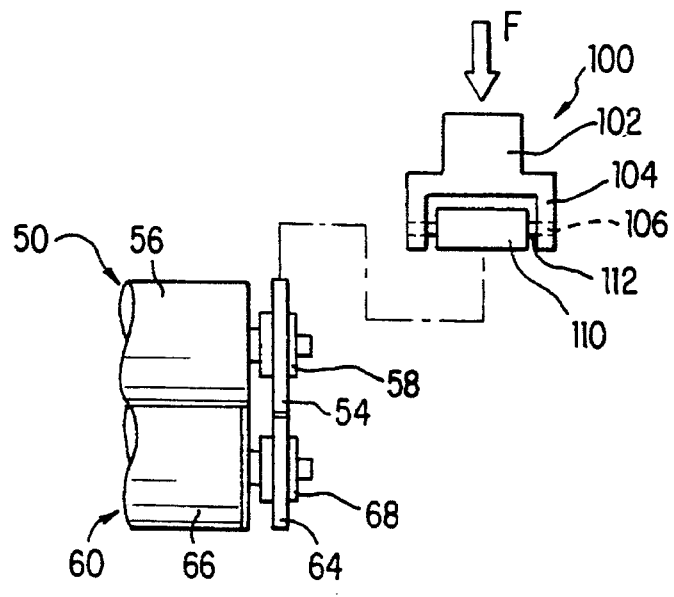
FIG. 2 is a plan view of the rolls of the apparatus depicted in FIG. 1 and a force-applying mechanism according to another embodiment of the present invention.

FIG. 2 shows another embodiment of the invention which includes a cam follower device 100 for applying force directly against the bearers 54 of rear roll 50. A cam follower device 100 is provided to apply force against each bearer 54 of roll 50, however, only one bearer 54 and one device 100 are shown in FIG. 2. The cam follower 100 includes a main body portion and a pair of arms 102 having openings 104 therethrough. A rotatable member 110 has pins 112 located in openings 104 to rotatably secure member 110 to the body portion of cam follower 100. The arrow F indicates the force applied to cam followers 100 which is transferred to the bearers 54 of rear roll 50, the rotatable members 110 engaging the rotating bearers 54 and being rotated thereby. Thus, the cam followers 100 serve to bias bearers 54 against bearers 64 to maintain the size of the roll gap substantially constant as discussed above with respect to the previous embodiments.

FIG. 3 is a somewhat schematic representation of the force applied to the rear roll 50. Force-applying mechanisms 170 include elements 172 which apply force against the apparatus so as to bias the rear roll 50 toward front roll 60. As mentioned above, the force could be applied to various components of the apparatus. However, because the bearers of the two rolls 50, 60 are in direct contact, the result of such application of force is that the bearers 54 are driven against bearers 64, as indicated by the arrows in FIG. 3, to maintain the gap size substantially constant.

In another preferred embodiment, the force-applying mechanisms apply force to the bearings in which are journalled the ends 52 of the rotating rear roll 50. As noted above, each roll 50, 60 is provided with bearings to allow smooth rotation, which bearings may be disposed in housings located adjacent the ends of the rolls. The force-applying mechanisms directly engage the bearing housings of the rear roll 50 and force the bearers 54 thereof against bearers 64 of front roll 60. The benefits of this embodiment include the force-applying mechanisms being located away from the dough material such that they do not interfere with the shutting operation and/or the material being sheeted. This feature also provides easy access to the force-applying mechanisms, for example, for maintenance purposes.

The present invention may be carried out by a sheerer operator monitoring a sheeting operation to determine the maximum force which will be exerted on the rolls by the material being sheeted. Then, according to the present invention, the force-applying mechanisms would be set to apply to the one roll a force that is greater than the maximum force generated by the material, thereby ensuring that the size of gap G will remain substantially constant and the sheeted material will have a substantially uniform thickness.

While the present invention and the embodiments presented herein have been set forth and described in detail for the purposes of making a full and complete disclosure of the subject matter thereof, the disclosure herein presented is not intended to be limiting in any way with respect to the scope of this invention as the same is set forth in the appended claims.

What is claimed is:

1. An apparatus for forming a sheet of material having a substantially uniform thickness, the apparatus comprising:

a support;

a first roll mounted on the support at a fixed position and being rotatable relative to the support;

a drive device for rotating the first roll;

a second roll mounted on the support and being movable and rotatable relative to the support, the second roll positioned adjacent to the first roll and defining a gap between the first and second rolls of a size which forms a sheet of material of a desired thickness from a supply of the material fed into the gap between the rotating first and second rolls;

a drive device for rotating the second roll;

the first roll having opposite ends and a central portion with an outer surface, each of the opposite ends provided with a bearer member having an outer surface;

the second roll having opposite ends and a central portion with an outer surface, each of the opposite ends of the second roll provided with a bearer member having an outer surface;

wherein the respective bearer members of the first and second rolls contact each other and the gap is formed between the central portions of the first and second rolls; and a force-applying mechanism which applies force to bias the second roll toward the first roll to maintain the size of the gap at a substantially constant value during operation of the apparatus.

2. An apparatus according to claim 1, wherein the outer surfaces of the bearer members of at least one of the first and second rolls are spaced from the outer surface of the central portion of said at least one of the first and second rolls, whereby the respective bearer members of the first and second rolls contact each other and the gap is formed between the central portions of the first and second rolls.

3. An apparatus according to claim 1, wherein the first roll is secured to a first frame member fixedly mounted on the support, and the second roll is secured to a second frame member movably mounted on the support, and the force-applying mechanism applies force to the second frame member to bias the second roll against the first roll.

4. An apparatus according to claim 3, wherein the second frame member is pivotally secured to the support and together with the first frame member forms a scissor-like arrangement with the second roll being movable toward or away from the first roll, and the force-applying mechanism engages the second frame member to bias the second roll toward the first roll.

5. An apparatus according to claim 1, wherein the second roll is provided with bearings contained in a housing, and the force applying mechanism applies force to the bearing housing to bias the second roll toward the first roll.

6. An apparatus according to claim 1, wherein the bearer members of the first roll are non-rotatable with respect to the first roll while the bearer members of the second roll are rotatable relative to the second roll, whereby rotation of the first roll rotates the bearer members of the first roll thereby rotating the bearer members of the second roll.

7. An apparatus according to claim 6, wherein the force-applying mechanism applies force against the bearer members of the second roll.

8. An apparatus according to claim 7, wherein the force-applying mechanism includes a cam follower which includes a rotatable member which contacts each bearer member of the second roll such that the rotatable member of the cam follower rotates along with the bearer member, and wherein the cam follower applies force against the bearer member of the second roll to bias the second roll toward the first roll.

9. An apparatus according to claim 1, further comprising a cutter for cutting the sheet of material.

10. An apparatus according to claim 1, wherein the force-applying mechanism is a hydraulic cylinder.

11. An apparatus according to claim 1, wherein the force-applying mechanism is a screw jack.

12. An apparatus for forming a sheet of material having a substantially uniform thickness despite variations or inconsistencies in the material, the apparatus comprising:

a first rotatable roll mounted on the apparatus at a fixed position and being rotatable relative thereto;

a device for rotating the first roll;

a second rotatable roll mounted on the apparatus and being movable and rotatable relative thereto;

a device for rotating the second roll;

the first and second rolls positioned adjacent each other on the apparatus and defining a gap therebetween having a size selected to form a sheet of material of a desired thickness from a supply of the material fed into the gap between the rotating first and second rolls;

the first and second rolls each having opposite ends and a central portion with an outer surface;

wherein the opposite ends of the first roll abut the opposite ends of the second roll, and the outer surface of the central portion of the first roll is spaced from the outer surface of the central portion of the second roll to form the gap between the central portions of the rolls;

means for applying force to bias the second roll toward the first roll so as to maintain the size of the gap at a substantially constant value during operation of the apparatus.

13. An apparatus according to claim 12, wherein the ends of the first and the second roll are provided with bearer members, and the respective bearer members of the first and second rolls contact each other to form the gap between the central portions of the first and second rolls.

14. An apparatus according to claim 13, wherein the bearer members of one of said rolls have an outer surface which is substantially coextensive with the outer surface of the central portion of said one roll, and the bearer members of the other of said rolls have an outer surface which is spaced from the outer surface of the central portion of said other roll, whereby the bearer members of said one roll contact the bearer members of said other roll and form the gap between the outer surfaces of the central portions of said rolls.

15. An apparatus according to claim 13, wherein the bearer members of the first roll are non-rotatable with respect to the first roll while the bearer members of the second roll are rotatable relative to the second roll, whereby rotation of the first roll rotates the bearer members of the first roll thereby rotating the bearer members of the second roll.

16. A process of forming a sheet of dough material having a substantially uniform thickness from a supply of the dough material, the process comprising steps of:

providing a sheerer apparatus including first and second rotatable rolls which define a gap between the rolls into which the dough material is fed, the first roll being fixed on the apparatus;

selecting the size of the gap to form a sheet of material having a desired thickness;

applying a preselected amount of force to the second roll to bias the second roll toward the first roll, the amount of force being sufficient to overcome forces exerted on the apparatus during sheeting of the dough material due to variations in the consistency of the dough material which cause relative movement between the first and second rolls and alter the size of the gap located between the rolls; and feeding the dough material from the supply into the gap located between the rotating rolls;

whereby the thickness of the formed sheet of dough material is substantially uniform despite variations in the consistency of the dough material.

17. A process according to claim 16, wherein the force is applied directly against the second roll.

* * * * *